UNITED STATES PATENT OFFICE 3,672,844
Patented June 27, 1972

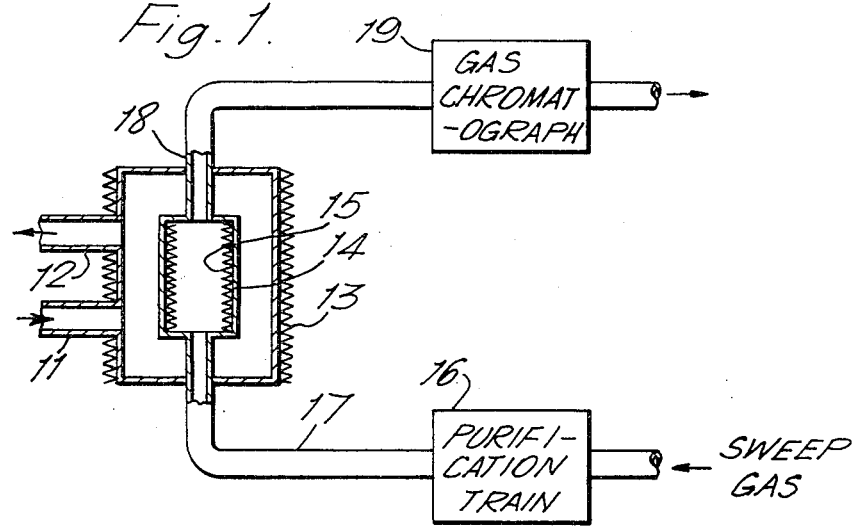
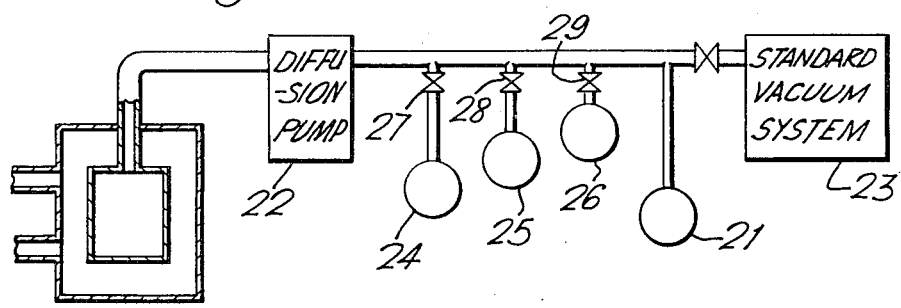
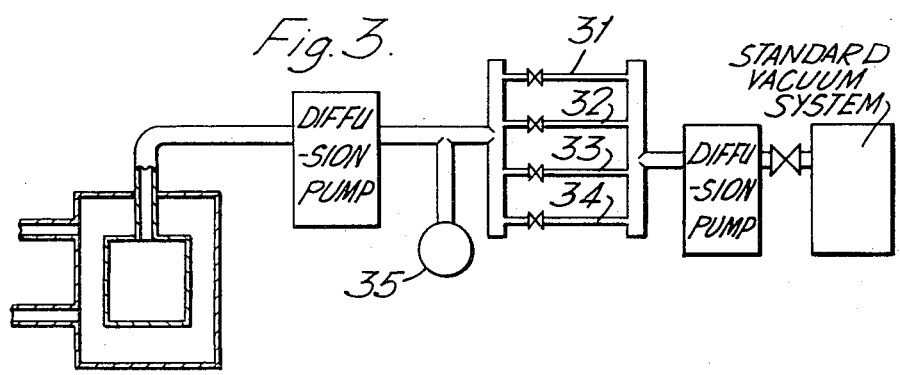

3,672,844
CARBON CONTENT ANALYSIS
Geoffrey Long, Abingdon, England, assignor to United Kingdom Atomic Energy Authority, London, England
Filed June 9, 1970, Ser. No. 44,726
Claims priority, application Great Britain, June 13, 1969, 30,212/69
Int. Cl. G01n 7/10, 7/12, 7/00
U.S. Cl. 23—253 R                                    9 Claims

ABSTRACT OF THE DISCLOSURE

An enclosure of a metal in which carbon is soluble and mobile at the relevant operating temperature is inserted into the fluid to be analysed for carbon content. On the interior surface of the enclosure is a layer of solid decarburant. Carbon permeating through the walls of the enclosure reacts with the decarburant to produce a gas. Measurement of this gas production provides an indication of carbon content of the fluid.

BACKGROUND OF THE INVENTION

The present invention relates to a device for measuring the carbon content of fluids, particularly molten metals.

It is known that the presence of the carbon in liquid metals may cause damage or create difficulties. For example, the presence of carbon in liquid sodium which is used as a coolant in a nuclear reactor may cause carburising of steel structural parts of the reactor. In order to avoid this, it is necessary to monitor continuously the carbon content of the molten sodium so that when necessary a proportion may be withdrawn and passed to a clean-up system. There is therefore a need for a monitor for the carbon content of sodium in nuclear reactors. The above example is given purely by way of explanation. There are other environments where it is desired to measure the carbon content of a molten metal, for example in the steel industry it would be very convenient to perform a rapid analysis for carbon upon the molten steel.

SUMMARY OF THE INVENTION

The invention provides a device for measuring the carbon content of a fluid comprising an enclosure for insertion into the fluid, the enclosure comprising a material in which carbon is both soluble and mobile at the operating temperature and having a layer of a solid decarburant upon its inner surface, and means for measuring the products of decarburising.

The invention also provides a device for measuring the carbon content of molten metals comprising an enclosure for insertion into the molten metal, the enclosure comprising a material in which carbon is both soluble and mobile at the operating temperature and having a layer of a solid decarburant upon its inner surface, and means for measuring the products of decarburising.

In a convenient arrangement the solid decarburant is a metal oxide, for example ferrous oxide, which will react with the carbon permeating through the enclosure to give a gaseous decarburising product. The reactions are as follows:

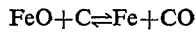

followed in some circumstances by:

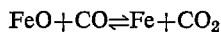

It will be appreciated that the reactions are equilibrium reactions. Hence the production of carbon oxides at the inner surface of the enclosure may be measured either by a static or a dynamic method. The carbon oxide preduction is related to the carbon activity at the inner surface of the enclosure, the carbon concentration gradient across the wall of the enclosure and the car-activity in the molten metal in contact with the outer surface of the enclosure. It will be appreciated therefore that the device of the present invention actually measures the thermodynamic carbon activity or carburising potential of the fluid or molten metal and is insensitive to solid carbon that may be in suspension therein.

In the static method, advantage is taken of the fact that, for a given temperature, the equilibrium carbon oxide concentration depends on the carbon activity in the molten metal. This carbon oxide concentration is most easily measured by determining its partial pressure which may be deduced from a determination of the pressure change within the enclosure.

In the dynamic method, the carbon monoxide concentration is reduced to zero by removing it as it is formed and measuring its rate of production. This may easily be effected by vacuum pumping or by the use of a sweep gas, the removed carbon monoxide being continuously or intermittently quantitatively analysed. It will be understood that a sweep gas, if used, must not react with the oxide layer or with the carbon monoxide and that precautions should be taken that the carbon monoxide does not react with any parts of the apparatus or decompose to deposit carbon before it is analysed. The measured rate of production of carbon monoxide is then related, for a given thickness and area of known enclosure material, to the carbon activity in the molten metal.

The enclosure preferably comprises metal and, for determination of the carbon content of molten sodium, the enclosure may conveniently comprise iron, nickel or their alloys. It will be understood that the fluid or molten metal should not contain an appreciable quantity of hydrogen as, in general, this will pass very readily through iron or nickel into the enclosure and interact with the oxide layer. In general, for steel, it is more difficult to find a suitable metal for the enclosure and it may be necessary to use a carbide or a similar refractory material. The importance of absence of hydrogen from the fluid under examination is such as to reduce significantly the range of applicability of the device to analysis of carbon content of gaseous systems. The appreciation of the applicability of the device to molten metals is regarded as a principal and important aspect of the present invention.

DESCRIPTION OF PREFERRED EMBODIMENTS

Specific constructions of device embodying the invention will now be described by way of example and with reference to the accompanying drawings in which:

FIG. 1 is a diagrammatic representation of a device,
FIG. 2 is a diagrammatic representation of a modified device, and
FIG. 3 is a diagrammatic representation of a further modified device.

In all three examples production of carbon oxides is measured dynamically.

Referring to FIG. 1, fluid or molten metal passes, via inlet and outlet pipes 11, 12 respectively, through a furnace 13. Immersed in the fluid in the furnace is a thimble 14 which provides an enclosure. The thimble is metal, for example iron, nickel or an alloy of iron or nickel, in which carbon is both soluble and mobile at the operating temperature (e.g. 600° C. to 700° C. for molten sodium). The interior surface is coated 15 with a layer of oxide, conveniently an oxide of the metal of the thimble 14.

A source (not shown) of a sweep gas, having the properties discussed above, is coupled via a standard purification train 16 and pipeline 17 to the thimble 14. An outlet 18 from the thimble 14 carries the sweep gas and the decarburising product gas to a gas chromatograph 19 where analysis for carbon oxides is carried out.

In operation carbon in the fluid within furnace 13 migrates through the walls of the thimble 14 and reacts with the oxide layer to form gaseous carbon oxides. The concentration of the gaseous carbon oxides, as determined with the gas chromatograph, then provides the required indication of carburising potential of the fluid in the furnace.

It will be appreciated that periodic exposure of the interior of the thimble to a controlled oxidising atmosphere will be necessary to restore the oxide layer.

In the examples of FIGS. 2 and 3, the furnace and thimble arrangement is similar to the FIG. 1 arrangement except that the thimble has only one pipeline connection to vacuum system.

In the FIG. 2 arrangement the rate of change of pressure measured by gauge 21 provides an indication of the rate of formation of gaseous carbon oxides. The region between diffusion pump 22 and standard vacuum system 23 comprises an isolated backing volume, the capacity of which is adjustable by virtue of the chambers 24, 25, 26 and valves 27, 28, 29. This adjustability enables the system to be optimised for a wide range of different flow rates.

In the FIG. 3 arrangement the gaseous carbon oxides are pumped through a selected one or more of capillaries 31, 32, 33, 34. The effective pressure drop across the capillary or capillaries is indicated by pressure gauge 35, so that the reading on this gauge gives a direct indication of flow rate.

The invention is not restricted to the details of the foregoing examples.

I claim:

1. A device for measuring the carbon content of a fluid comprising an enclosure for insertion into the fluid, the enclosure comprising a material in which carbon is both soluble and mobile at the operating temperature and having a layer of a solid decarburant upon its inner surface, and means for measuring the products of decarburising.

2. A device for measuring the carbon content of molten metals comprising an enclosure for insertion into the molten metal, the enclosure comprising a material in which carbon is both soluble and mobile at the operating temperature and having a layer of a solid decarburant upon its inner surface, and means for measuring the products of decarburising.

3. A device as claimed in claim 1, wherein the solid decarburant is a metal oxide.

4. A device as claimed in claim 3, wherein the enclosure comprises iron and the solid decarburant comprises ferrous oxide.

5. A device as claimed in claim 1, wherein the means for measuring the products of decarburising comprise means for measuring the static pressure change within the enclosure.

6. A device as claimed in claim 1, wherein the means for measuring the products of decarburising comprise means for removing carbon monoxide from the enclosure as it is formed and means for determining the quantity of carbon monoxide removed.

7. A device as claimed in claim 6, wherein the means for removing carbon monoxide from the enclosure comprises means for driving a flow of sweep gas through the enclosure.

8. A device as claimed in claim 6, wherein the means for removing carbon monoxide from the enclosure comprises a vacuum system.

9. A device as claimed in claim 8, wherein the means for determining the quantity of carbon monoxide removed comprises means for determining the flow rate of gas to the vacuum system.

References Cited

UNITED STATES PATENTS

| | | | |
|---|---|---|---|
| 2,991,684 | 7/1961 | Wever et al. | 23—230 |
| 3,252,759 | 5/1966 | Simon | 23—230 |
| 3,252,760 | 5/1966 | Winkler et al. | 23—230 |
| 3,279,888 | 10/1966 | Holler | 23—230 |

MORRIS O. WOLK, Primary Examiner

R. E. SERWIN, Assistant Examiner

U.S. Cl. X.R.

23—230 R, 230 PC, 232 R, C, 253 PC, 254 R